United States Patent
Park et al.

(10) Patent No.: US 9,282,519 B2
(45) Date of Patent: Mar. 8, 2016

(54) APPARATUS AND METHOD FOR CONTROLLING TRANSMISSION AND RECEPTION OPERATIONS IN WIRELESS COMMUNICATION SYSTEM

(75) Inventors: Bok-Ju Park, Suwon-si (KR);
Young-Eil Kim, Suwon-si (KR);
Jun-Seok Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 13/547,625

(22) Filed: Jul. 12, 2012

(65) Prior Publication Data
US 2013/0094414 A1    Apr. 18, 2013

(30) Foreign Application Priority Data
Oct. 14, 2011    (KR) ........................ 10-2011-0105564

(51) Int. Cl.
*G08C 17/00*    (2006.01)
*H04W 52/02*    (2009.01)

(52) U.S. Cl.
CPC ...... *H04W 52/0274* (2013.01); *H04W 52/0216* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 5,774,813 | A * | 6/1998 | Jokinen | 455/574 |
| 6,353,749 | B1 * | 3/2002 | Siponen | 455/574 |
| 7,456,611 | B2 * | 11/2008 | Mullett et al. | 320/130 |
| 2003/0050026 | A1 * | 3/2003 | Connell et al. | 455/183.1 |
| 2011/0012582 | A1 * | 1/2011 | Aisu | 323/314 |
| 2011/0051641 | A1 * | 3/2011 | Pan | 370/311 |
| 2011/0098077 | A1 | 4/2011 | Gholmieh | |
| 2011/0157919 | A1 * | 6/2011 | Yedevelly et al. | 363/20 |
| 2011/0292854 | A1 * | 12/2011 | Terry et al. | 370/311 |
| 2012/0154958 | A1 * | 6/2012 | Schneider | 361/18 |
| 2012/0236489 | A1 * | 9/2012 | Foo et al. | 361/679.32 |

FOREIGN PATENT DOCUMENTS

| | | |
|---|---|---|
| EP | 0 939 495 A1 | 9/1999 |
| KR | 10-2009-0025000 A | 3/2009 |
| KR | 10-2011-0006473 A | 1/2011 |
| KR | 10-2011-0050301 A | 5/2011 |

* cited by examiner

*Primary Examiner* — Kibrom T Hailu
(74) *Attorney, Agent, or Firm* — Jefferson IP Law, LLP

(57) ABSTRACT

An apparatus and a method for controlling transmission and reception control in a wireless communication system are provided. The apparatus includes at least one voltage regulator, a power source consumer, at least one capacitor, and a controller. The at least one voltage regulator provides a power source that is a regulated voltage. The power source consumer processes a Radio Frequency (RF) signal using the power source that is the regulated voltage. The at least one capacitor is connected to an output port of the at least one voltage regulator and a power source input port of the power source consumer. The controller turns off the at least one voltage regulator during a deactivation period of the communication apparatus and turns on the at least one voltage regulator during an activation period of the communication apparatus.

18 Claims, 9 Drawing Sheets

APPARATUS AND METHOD FOR CONTROLLING TRANSMISSION AND RECEPTION OPERATIONS IN WIRELESS COMMUNICATION SYSTEM

PRIORITY

This application claims priority under 35 U.S.C. §119(a) of a Korean patent application filed in the Korean Intellectual Property Office on Oct. 14, 2011 and assigned Serial No. 10-2011-0105564, the entire disclosure of which is hereby incorporated by reference.

BACKGROUND OF THE INVENTION

1. Field of the Invention

The present invention relates to a wireless communication system.

2. Description of the Related Art

Generally, a transceiver for a $3^{rd}$ Generation (3G) and/or a $4^{th}$ Generation (4G) mobile communication system controls transmission and reception operations on a per-frame basis. For example, in the Long Term Evolution (LTE) standard, which is one of the 4 G communication standards, one frame has a length of 10 milliseconds (ms), and includes 10 sub-frames, each having a length of 1 ms.

A receiver controls a communication channel on a per-subframe basis, and programs operations of a respective mobile communications system. A transmitter also controls the channel on the per-subframe basis, and programs operations of a respective mobile communications system. At this time, the transmitter may execute a Discontinuous Transmission (DTX) mode so as to intermittently turn on/off an output in a subframe period. The DTX mode saves power consumption in a transmitter. For the same purpose, the receiver may execute a Discontinuous Reception (DRX) mode. The main roles of the DTX mode and the DRX mode are to allow a terminal not to continuously monitor control channels, and to deactivate a Radio Frequency (RF) block, thus placing it into a sleep state, and to immediately activate the RF block in a defined interval. An example of an RF output dependent on the DTX mode is illustrated in FIG. 1 below.

FIG. 1 illustrates RF outputs that depend on a DTX mode in a wireless communication system according to the related art.

Referring to FIG. 1, a frame 110 includes a plurality of subframes 120. In FIG. 1, the DTX mode is defined as turning on a transmission operation at an even-number subframe and turning off the transmission operation at an odd-number subframe. According to this, as illustrated in FIG. 1, the RF outputs occur in the even-number subframes, and do not occur in the odd-number subframes. For example, the LTE standard prescribes that a time required for completing a transition from a shut-down state to an activation state or from the activation state to the shut-down state, according to the DTX mode, be within 20 microseconds (μs).

Generally, a transmitter of a wireless communication system includes a RF Integrated Circuit (RFIC), a Power Amplifier (PA), and a front end. In a $2^{nd}$ Generation (2G) system, a 2.5 Generation (2.5G) system, and other similar systems, the RFIC, the PA, the front end, and other similar elements, were directly supplied with a battery power as their power sources for operation. The PA is an element typically having the highest power consumption in the transmitter. When the PA is directly supplied with the battery power, the loss characteristics of the PA may vary according to a change of voltage resulting from charging and/or discharging of a battery. Accordingly, until the depletion of charged battery cells occurs after the charging of the battery cells, or in other words, during a discharging of the battery cells, the efficiency characteristics of the PA are not at an optimal point. That is, the PA fails to maintain excellent characteristics over the whole interval including the charging and the discharging of the battery cells. Also, in a geographic area crowded with base stations, such as a metropolitan area, a transmission output of the PA may be low power or mid power rather than peak power. But, at the time of low power or mid power transmission output, a PA that is optimized for efficiency at peak power using the battery voltage may suffer a big loss because of an unnecessarily high source voltage.

According to this, in order to eliminate a factor of performance loss resulting from a battery voltage change or a mid power transmission, a next-generation communication system employs a voltage regulator, such as a Direct Current (DC)-DC converter, a Low Drop-Out (LDO) linear regulator, and other similar or suitable voltage regulators, in order to regulate battery power, and supplies a pre-regulated power source as power sources for core devices of a transmitter. Due to this, although there is a change of voltage during a charge/discharge cycle of the battery, the transmitter may be supplied with a regulated voltage that is regulated through the voltage regulator and, even for low power or mid power transmissions, the transmitter may also be supplied with a power source having as low voltage as necessary. Accordingly, the core devices of the transmitter may continuously operate at an optimal efficiency point and also, a power loss resulting from a source voltage overhead may be prevented.

The voltage regulator supplying the regulated voltage may include a capacitor having a very large capacity at its output port, and may regulate an output voltage using the capacitor. Accordingly, quite a long time may be needed in order to make a transition from an off state to an on state and reach a regulated voltage, or in order to make a transition from the on state to the off state and reach 0V. That is, the time required for the charge/discharge cycle of the capacitor makes it impossible to turn on/off the voltage regulator according to an activation/deactivation cycle of a transmission operation dependent on very fast time intervals, such as the DTX mode.

As described above, if a communication device is powered up, the voltage regulator may maintain an on state regardless of on/off of devices in the transmitter. Due to this, the voltage regulator consumes a current used for operation, even in an idle state, in which the transmitter does not operate. Generally, for a relatively long time, a mobile terminal operates in the idle state so as to be not transmitting and receiving, such that electric current that the voltage regulator continuously consumes during the idle state may reach a considerable amount as an accumulated power loss. Also, the voltage regulator continuously consumes electric current, even in the DTX mode described with reference to FIG. 1. This problem may also occur even in the DRX mode. According to intuitive recognition, it seems that the power waste problem of the voltage regulator may be addressed if the amount of current consumed by the voltage regulator is designed to be small. But, decreasing the amount of current consumed may incur a new problem of causing a deterioration of performance. Accordingly, there is a need to propose an alternative for minimizing the amount of current consumed by the voltage regulator without performance loss due to the voltage regulator.

SUMMARY OF THE INVENTION

Aspects of the present invention are to address at least the above-mentioned problems and/or disadvantages and to provide at least the advantages described below. Accordingly, an aspect of the present invention is to provide an apparatus and method for minimizing a waste of electric current occurring in a transmitter in a wireless communication system.

Another aspect of the present invention is to provide an apparatus and method for minimizing the current consumed by a voltage regulator in a wireless communication system.

A further aspect of the present invention is to provide an apparatus and method for performing transmission/reception control optimized to a Discontinuous Transmission/Discontinuous Reception (DTX/DRX) mode in a wireless communication system.

Yet another aspect of the present invention is to provide an apparatus and method for a fast transition between activation and deactivation states during DTX/DRX mode execution in a wireless communication system.

The above aspects are achieved by providing an apparatus and method for controlling transmission and reception operations in a wireless communication system.

According to an aspect of the present invention, a communication apparatus in a wireless communication system is provided. The apparatus includes at least one voltage regulator, a power source consumer, at least one capacitor, and a controller. The at least one voltage regulator provides a power source that is a regulated voltage. The power source consumer processes a Radio Frequency (RF) signal using the power source that is the regulated voltage. The at least one capacitor is connected to an output port of the at least one voltage regulator and a power source input port of the power source consumer. The controller turns off the at least one voltage regulator during a deactivation period of the communication apparatus and turns on the at least one voltage regulator during an activation period of the communication apparatus.

According to another aspect of the present invention, an operation method of a communication device in a wireless communication system is provided. The method includes turning off at least one voltage regulator during a deactivation period of the communication device, and turning on the at least one voltage regulator during an activation period of the communication device.

According to yet another aspect of the present invention, a baseband processing apparatus of a communication device in a wireless communication system is provided. The apparatus includes a determination unit and a generator. The determination unit is for determining a deactivation period. The generator is for generating a control signal for turning off at least one voltage regulator during the deactivation period, and for generating a control signal for turning on the at least one voltage regulator during an activation period.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of the present invention will become more apparent from the following detailed description when taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

Figure 1:
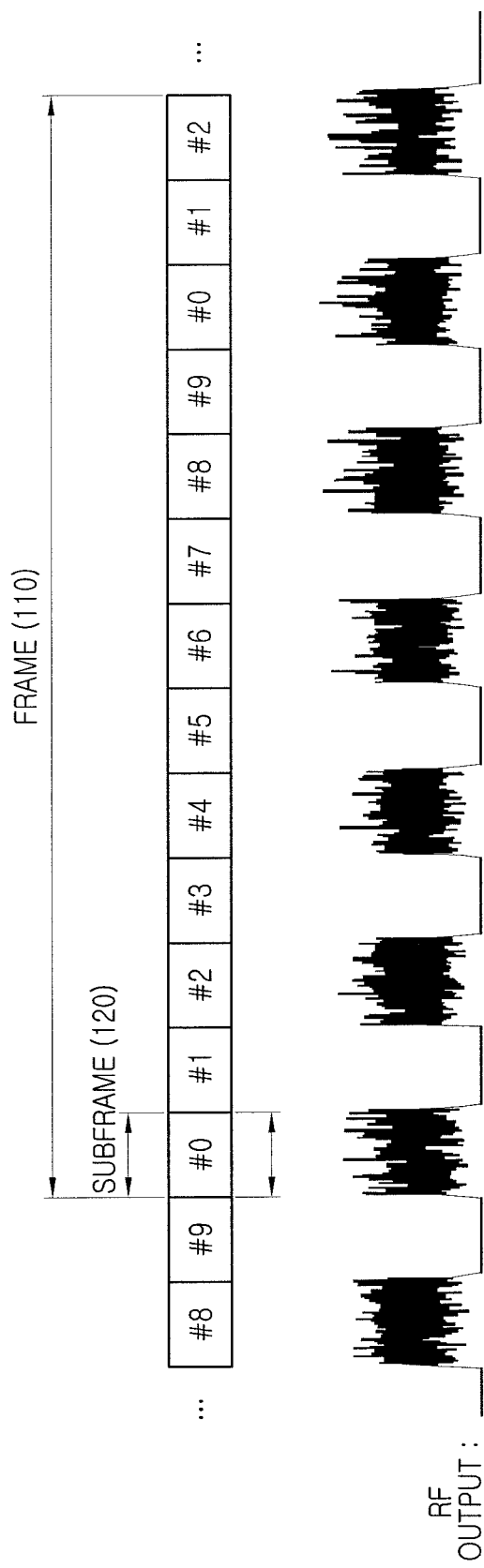
FIG. 1 illustrates Radio Frequency (RF) outputs dependent on a Discontinuous Transmission (DTX) mode in a wireless communication system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present exemplary embodiments relate to an apparatus and method for controlling transmission and reception operations in a wireless communication system and are for minimizing the current consumption of a voltage regulator in a wireless communication system. More particularly, a Discontinuous Transmission (DTX) mode and a Discontinuous Reception (DRX) mode are described with respect to the Long Term Evolution (LTE) standard. However, the present invention is not limited thereto, and the present invention may be applied to other similar and suitable communication systems having an intermittent deactivation period that is generated like the DTX mode and the DRX mode. For instance, the other systems may be High Speed Packet Access (HSPA), High Speed Downlink Packet Access (HSDPA), High Speed Uplink Packet Access (HSUPA), Wireless Fidelity (WiFi), Worldwide Interoperability for Microwave Access (WiMAX) and other similar communications systems.

A timing rule for controlling transmission and reception operations according to the present exemplary embodiments is described below. For description convenience below, the DTX mode is described for example, but the timing rule described is applicable to the DRX mode as well. Control timing for turning on/off core devices of a transceiver in a communication device according to an exemplary embodiment of the present invention includes both a 'rule of DTX completion timing' and a 'rule of activation/deactivation timing of core devices'. Detailed examples of the timing rules of Table 1 are given below.

TABLE 1

| Rule Number | Timing Rule |
| --- | --- |
| 1. | DTX completion timing (transition between On-Off states of transmitter) |
| 2. | Activation/deactivation timing of transmitter core devices |
| 2.1 | DTX synchronization activation/deactivation of transmitter core devices |
| 2.1.1 | Activation/deactivation of Radio Frequency Integrated Circuit (RFIC), Power Amplifier (PA), and front end |
| 2.1.2 | Activation/deactivation of voltage regulator |
| 2.2 | DTX asynchronization activation/deactivation of transmitter core devices |
| 2.2.1 | Extra activation/deactivation of voltage regulator |
| 2.2.1.1 | Power-up charging activation |
| 2.2.1.2 | Intermittent charging activation |

The details of the timing rule given in Table 1 above are given as follows.

Rule 1 for DTX completion timing is described in further detail below. In compliance with a timing rule according to an exemplary embodiment, the time taken for a transmitter to complete state transition from a shut-down to an enabled state or from the enabled state to the shut-down state, for a DTX mode, is defined as occurring within a length of one Cyclic Prefix (CP). The CP is a symbol guard interval for preventing symbol distortion caused by inter-symbol mutual interference resulting from a multiple path delay. In an Orthogonal Frequency Division Multiplexing (OFDM) system, the CP is identical to a constant part of a rear of a symbol used to maintain orthogonality between subcarriers. For example, the CP may have a length of about 4.7 μs to 5.2 μs. For the state transition to occur within the length of one CP, all core devices of the transmitter support fast activation and fast deactivation. By virtue of the rule of the state transition occurring within the one CP, data of a symbol interval after the CP may be transmitted without a loss, so an effect of improving a data throughput may be obtained.

Rule 2 for activation/deactivation timing of transmitter core devices is described below, with specific reference to Rule 2.1 for DTX synchronization activation/deactivation of transmitter core devices. In the transmitter core devices, the time required for activation/deactivation may differ according to the respective characteristics of the transmitter core devices. Accordingly, in order for a final output RF signal of a transmitter to meet the DTX completion timing rule, each transmitter constituent element is provided with an on/off control signal separately. Alternatively, a DTX mode may be smoothly performed by simultaneously controlling an on/off state of all the transmitter core devices via only one control signal.

For rule 2.1.1 for activation/deactivation timing of an RFIC, a PA, and a front end, the RFIC, the PA, and the front end are turned on/off in synchronization with DTX activation/deactivation timing. For this, the RFIC, the PA, and the front end support fast enable and disable within one CP.

For rule 2.1.2 for activation/deactivation timing of voltage regulator, a capacitively output regulated voltage regulator, such as a Direct Current (DC)-DC converter, a Low Drop Out (LDO) regulator, and other similar regulators, may require a long time for reaching a designated output voltage because a large-capacity capacitor provided at an output port of the voltage regulator is charged/discharged at turn-on and shutdown (i.e., shut-off). Generally, a time of 100 μs or longer is needed for reaching the designated output voltage. Accordingly, in a DTX mode, the voltage regulator may continuously maintain an on state, and only the other core devices of a transmitter may be repeatedly turned-on and turned-off according to the DTX mode.

However, according to another exemplary embodiment of the present invention, even the voltage regulator turns on/off together with the other core devices of the transmitter. This is based on the fact that, if a capacity of the capacitor provided at the output port of the voltage regulator is large enough, an output voltage of the voltage regulator may not suddenly decrease due to the capacitor being sufficiently large. For example, when the capacity of the capacitor is within a range of several nanofarads (nF) and, at deactivation, a leakage current of the transmitter core devices is within a range of several microamperes (μA), the output voltage of the voltage regulator does not decrease, and an on-state voltage may be maintained. After that, when a transmission interval arrives after the end of a non-transmission period of the DTX mode, if the voltage regulator turns on together with the other core devices of the transmitter, the voltage regulator may not require a long time for charging the capacitor, unlike when a communication device is initially powered up, and the voltage regulator may supply a regulated voltage to the transmitter core devices within a short time.

Accordingly, a communication device, according to the present exemplary embodiments, may control an on/off state of all blocks of the communication device, including the voltage regulators as well as the RFIC, the PA, and the front end, which are transmitter core devices, by one common control signal synchronized to a DTX mode control signal. In such a case, the number of the control signals is minimized and an operational current that the voltage regulator consumes in a DTX non-transmission interval is cut off, and thus, the transmission efficiency of the transmitter is improved. Particularly, the aforementioned features may improve the transmission efficiency in an urban environment in which the transmitter mainly operates at low power or mid power.

Rule 2.2 is for DTX asynchronization activation/deactivation of transmitter core devices, and particularly, Rule 2.2.1 is for extra activation/deactivation of voltage regulator, and is applied to an interval in which a voltage regulator performs normal operations after a load capacitor of an output port of the voltage regulator is fully charged. As described above, although the voltage regulator may be turned on/off in synchronization with a DTX mode of core devices of a transmitter, a voltage of the voltage regulator may not decrease below a required magnitude, i.e., voltage level, because electric charges charging the load capacitor are discharged by a small amount at the time of short and intermittent turning off of the voltage regulator. However, in a case where the transmitter maintains an off state for a long time, there is a need for a control procedure capable of turning on/off the voltage regulator apart from the core devices of the transmitter.

Rule 2.2.1.1 is for power-up charging activation, such that when an apparatus is powered up, a load capacitor, which is disposed at an output port of a voltage regulator, is in a charge depletion state. Accordingly, the load capacitor is fully charged before the apparatus enters a normal activation state. For the sake of an initial charge of the load capacitor, the apparatus turns on the voltage regulator at the same time as the powering-up of the apparatus, thus, causing a long charging time for the load capacitor. For instance, the apparatus may provide the charging time of about 100 μs or longer. At this time, the core devices of the transmitter maintain an off state. After that, if the load capacitor is charged and an output voltage of the voltage regulator reaches a value greater than or equal to required voltages of the core devices, the transmitter may execute a DTX mode. As defined in the rule for activation/deactivation timing of the voltage regulator, the transmitter controls the on-off state of the core devices and the voltage regulator in synchronization with a DTX control signal.

Rule 2.2.1.2 is for intermittent charging activation, such as when an apparatus maintains an off state for a long or extended period of time, such as during a long idle state (e.g., an idle state of 5.12 seconds or longer) or a deep sleep state. In such a case, although during the extended off state, a minimum leakage current is consumed because transmitter core devices maintain the off state, if a voltage regulator is maintained in the off state, an output voltage of the voltage regulator may drop to or less than a threshold as a load capacitor of the voltage regulator is leaked and discharged. Accordingly, when the apparatus maintains the off state for a long time, although the transmitter is in the off state, the apparatus turns on only the voltage regulator, thereby recharging the load capacitor in order to restore the output voltage of the voltage regulator to a level greater than or equal to the threshold. Accordingly, the voltage regulator may promptly supply a regulated voltage, without a need for a long or extended recharge time for the load capacitor, when the DTX mode is executed after the long or extended time in the off state. To turn on/off the voltage regulators in asynchronization with a DTX command, the voltage regulators may have control inputs apart from transmitter core devices.

The above control timing rules may be applied irrespective of a signal modulation scheme complying with a specific communication standard, a power level, and a spectrum standard. Particularly, when the control timing rules discussed above are applied to a transmitter employing a capacitively output regulated voltage regulator, such as a DC-DC converter, an LDO, and other similar and suitable voltage regulators, and using a regulated voltage power source, the improvement of an output conversion efficiency as well as the improvement of a transmitter output signal quality may be expected.

The control timing rules described above may be applied to defining a control procedure. The control procedure may be programmed through a means such as a Central Processing Unit (CPU), a Digital Signal Processor (DSP), or other similar and suitable control devices, processing devices, and computing devices. Also, a control signal interface may be realized in any of serial and parallel interface forms.

Figure 2:
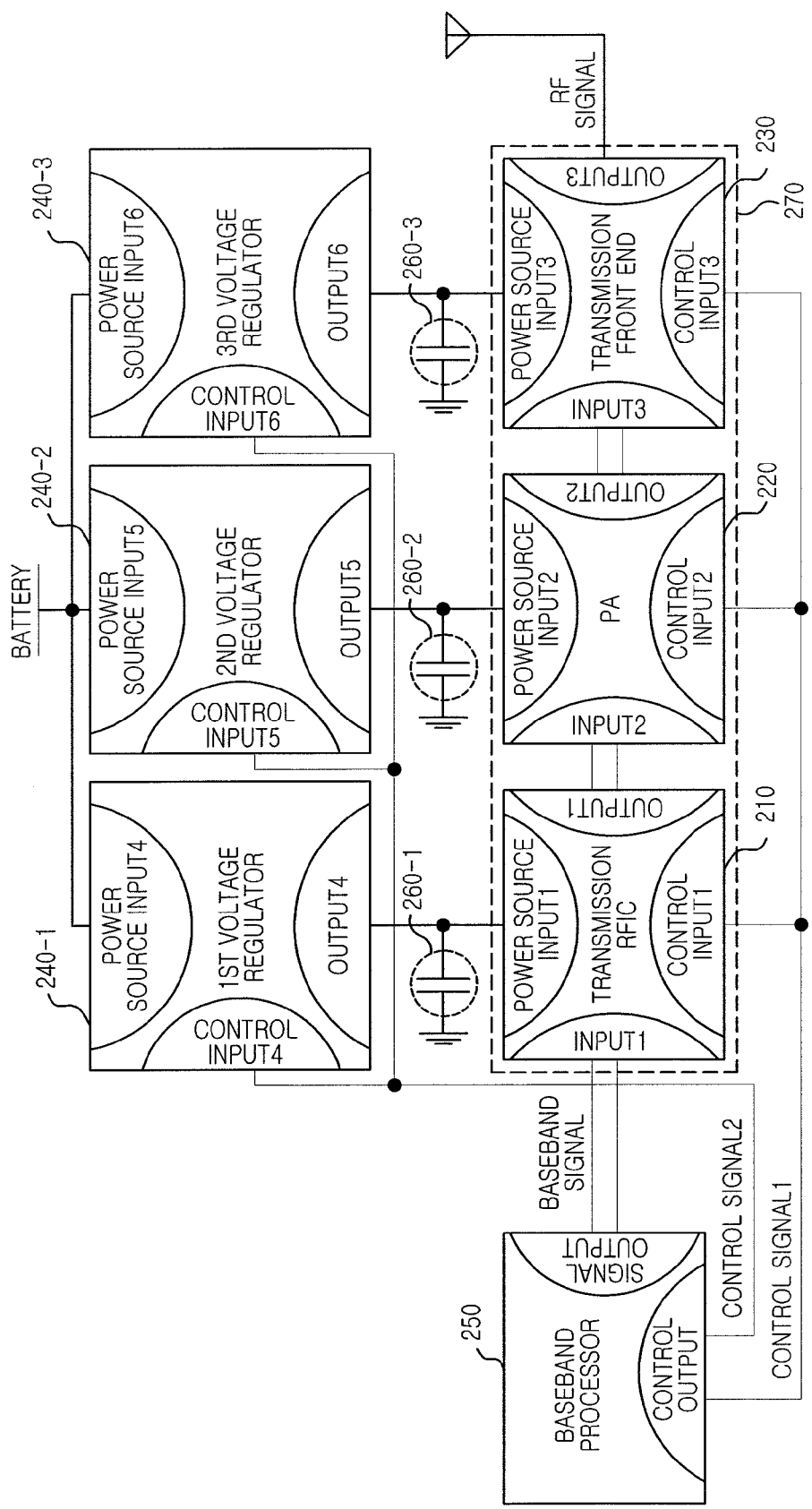
FIG. 2 illustrates a transmitter in a wireless communication system according to an exemplary embodiment of the present invention.

FIG. 2 illustrates a construction of a transmitter in a wireless communication system according to an exemplary embodiment of the present invention.

Referring to FIG. 2, the transmitter includes a transmission RFIC 210, a PA 220, and a transmission front end 230, which are transmitter core devices. The transmitter further includes a plurality of voltage regulators 240-1, 240-2, and 240-3, for supplying regulated voltages as power sources to the core devices, and also includes a baseband processor 250 for controlling other blocks.

The baseband processor 250 provides a baseband data signal to the transmission RFIC 210. Also, the baseband processor 250 may provide control signals for turning on/off the remaining blocks, i.e., the PA 220, the transmission front end 230, and the plurality of voltage regulators 240-1, 240-2, and 240-3. In providing the control signals, the baseband processor 250 may be referred to as a 'controller'.

The transmission RFIC 210 converts a baseband signal that is provided from the baseband processor 250, into an RF band signal. That is, although not shown, the transmission RFIC 210 may include an oscillator, a mixer and other similar and suitable components of a transmission RFIC. The PA 220 amplifies the RF band signal provided from the RFIC 210. The transmission front end 230 performs multiplexing of a transmit signal, duplexing, filtering, antenna switching and other similar transmission processes. That is, although not shown, the transmission front end 230 may include a Multiplexer (MUX), a duplexer, a filter, a switch and other similar transmission elements. The transmission RFIC 210, the PA 220, and the transmission front end 230 each include signal input/output ports, a power source input port, and a control input port. In the present exemplary embodiment of FIG. 2, the ports of the transmission RFIC 210 are referred to as 'input 1', 'output 1', 'power source input 1', and 'control input 1', the ports of the PA 220 are referred to as 'input 2', 'output 2', 'power source input 2', and 'control input 2', the ports of the transmission front end 230 are referred to as 'input 3', 'output 3', 'power source input 3', and 'control input 3'. The control input 1, the control input 2, and the control input 3 are enabled/disabled by a control signal 1 that is a single control signal provided from the baseband processor 250.

The first voltage regulator 240-1, the second voltage regulator 240-2, and the third voltage regulator 240-3, each include a power source input port, a control input port, and a power source output port. In the present exemplary embodiment of FIG. 2 the ports of the first voltage regulator 240-1 are referred to as 'power source input 4', 'output 4', and 'control input 4', the ports of the second voltage regulator 240-2 are referred to as 'power source input 5', 'output 5', and 'control input 5', and the ports of the third voltage regulator 240-3 are referred to as 'power source input 6', 'output 6', and 'control input 6'. The first voltage regulator 240-1, the second voltage regulator 240-2, and the third voltage regulator 240-3 are commonly supplied with a power source from a battery, and their outputs are supplied to corresponding transmitter core devices. In detail, an output of the first voltage regulator 240-1 is provided as a power source of the transmission RFIC 210, an output of the second voltage regulator 240-2 is provided as a power source of the PA 220, and an output of the third voltage regulator 240-3 is provided as a power source of the transmission front end 230. The core devices, which include the transmission RFIC 210, the PA 220, and the transmission front end 230, are provided with the power sources from the voltage regulators 240-1, 240-2, and 240-3 and therefore, may be commonly referred to as a power source consumer 270.

For the sake of regulation of an output voltage of each of the first voltage regulator 240-1, the second voltage regulator 240-2, and the third voltage regulator 240-3, capacitors 260-1, 260-2, and 260-3 are respectively disposed at output ports of the first voltage regulator 240-1, the second voltage regulator 240-2, and the third voltage regulator 240-3. The capacitors 260-1, 260-2, and 260-3 are respectively connected at one end to both the output ports of the voltage regulators 240-1, 240-2, and 240-3 and to the power source input ports of the core devices 210, 220, and 230, and are respectively connected at the other end to the ground.

As illustrated in FIG. 2, a scheme of supplying power sources apart from each core device using the plurality of voltage regulators 240-1, 240-2, and 240-3 is suitable when source voltages of the transmitter core devices are different from one another. If two or more core devices use the same source voltage, at least one of the plurality of voltage regulators 240-1, 240-2, and 240-3 may be excluded, and the two or more core devices may share one power source. In such a case, even the capacitors 260-1, 260-2, and 260-3 may be omitted at a quantity corresponding to the number of the excluded voltage regulators.

As illustrated in FIG. 2, the plurality of voltage regulators 240-1, 240-2, and 240-3 are commonly provided with a control signal 2 from the baseband processor 250. That is, the control input 4, the control input 5, and the control input 6 are enabled and/or disabled according to the control signal 2. Although not shown in FIG. 2, according to another exemplary embodiment, for a case when a corresponding core device does not need a regulated voltage, according to the characteristic of the core device or the requirement thereof, then the plurality of voltage regulators 240-1, 240-2, and 240-3 may support an operation of bypassing, such that a basic power source is directly supplied without voltage regulation. For example, the basic power source may be a battery power.

The baseband processor 250 outputs a baseband data signal through its signal output port. For example, according to a modulation scheme, the baseband data signal may be divided into an In-phase (I) signal and a Quadrature-phase (Q) signal and may then be output. The control signal output from a control output port of the baseband processor 250 includes the control signal 1 and a control signal 2. According to an exemplary embodiment of the present invention, the control signal 1 and the control signal 2 may be constructed as one control signal. Also, the control signal output from the baseband processor 250 may further include other control signals supplied to other core devices.

In accordance with the aforementioned timing rules described above, at initial power-up of a communication device, the baseband processor 250 turns off the voltage regulators 240-1, 240-2, and 240-3 after output voltages of the voltage regulators 240-1, 240-2, and 240-3 respectively reach required voltages of the core devices 210, 220, and 230 by respectively charging the capacitors 260-1, 260-2, and 260-3. In detail, the condition for turning off the voltage regulators 240-1, 240-2, and 240-3 is defined as one of whether the output voltages of the voltage regulators 240-1, 240-2, and 240-3 are greater than a predefined first threshold, and whether a predefined first duration time after the turn-on of the voltage regulators 240-1, 240-2, and 240-3 has lapsed. Here, the first duration time may be decided based on an average charging time of the capacitors 260-1, 260-2, and 260-3. For example, the turn-off operations of the voltage regulators 240-1, 240-2, and 240-3 may be realized through an analog feedback loop circuit, or may be programmed using a Central Processing Unit, a Digital Signal Processor, and other similar devices and elements.

In a case of real-time monitoring and feedback for controlling the output voltages of the voltage regulators 240-1, 240-2, and 240-3 via the analog feedback loop circuit, there is an advantage that, because a moment at which a recharge is needed may be identified, a power loss resulting from unnecessary activation is minimized, and, thus, a seamless recharge operation is possible. But, in the present case, there is a disadvantage that a high amount of electric current is consumed for operations of a sensor circuit for real-time voltage monitoring and the analog feedback control circuit. Accordingly, in the present case of employing the analog feedback loop circuit, the analog sensor and the feedback control circuit may be designed as low power consumption structures or elements in order to reduce power consumption at a maximum level as obtained through dynamic on-off operations of the voltage regulators 240-1, 240-2, and 240-3.

In accordance with the aforementioned timing rules, while a DTX mode is performed, the baseband processor 250 turns off the voltage regulators 240-1, 240-2, and 240-3, the transmission RFIC 210, the PA 220, and the transmission front end 230 within a DTX non-transmission interval. Here, the off state is a state where a corresponding block stops operation. In an off state, the transmission RFIC 210, the PA 220, and the transmission front end 230 do not consume power, and are considered to be an equivalent open circuit having very high impedance in view of the voltage regulators 240-1, 240-2, and 240-3. Accordingly, in a case of the off state, electric current does not flow, although a voltage is applied to a power source input. Thus, the capacitors 260-1, 260-2, and 260-3 repeat charging and discharging at short time intervals during the DTX mode and, due to this, the output voltages of the voltage regulators 240-1, 240-2, and 240-3 may be maintained at or greater than a constant value.

In accordance with the aforementioned timing rules, when the voltage regulators 240-1, 240-2, and 240-3 maintain the off state for a long time, due to an idle state, a deep sleep state or any other similar reason, the baseband processor 250 turns on the voltage regulators 240-1, 240-2, and 240-3 such that the capacitors 260-1, 260-2, and 260-3 are charged. The condition of turning on the voltage regulators 240-1, 240-2, and 240-3 may be one of whether the output voltages of the voltage regulators 240-1, 240-2, and 240-3 are less than a predefined second threshold, and whether a predefined second duration time, after the turn-off of the voltage regulators 240-1, 240-2, and 240-3, has lapsed. For example, the turn-on operations of the voltage regulators 240-1, 240-2, and 240-3 may be realized through an analog feedback loop circuit, or may be programmed using a CPU, a DSP, or other similar devices.

Also, the aforementioned timing rules may be applied to a receiver performing a DRX operation according to an exemplary embodiment of the present invention. The receiver according to the exemplary embodiment of the present invention can be constructed as in FIG. 3 below.

Figure 3:
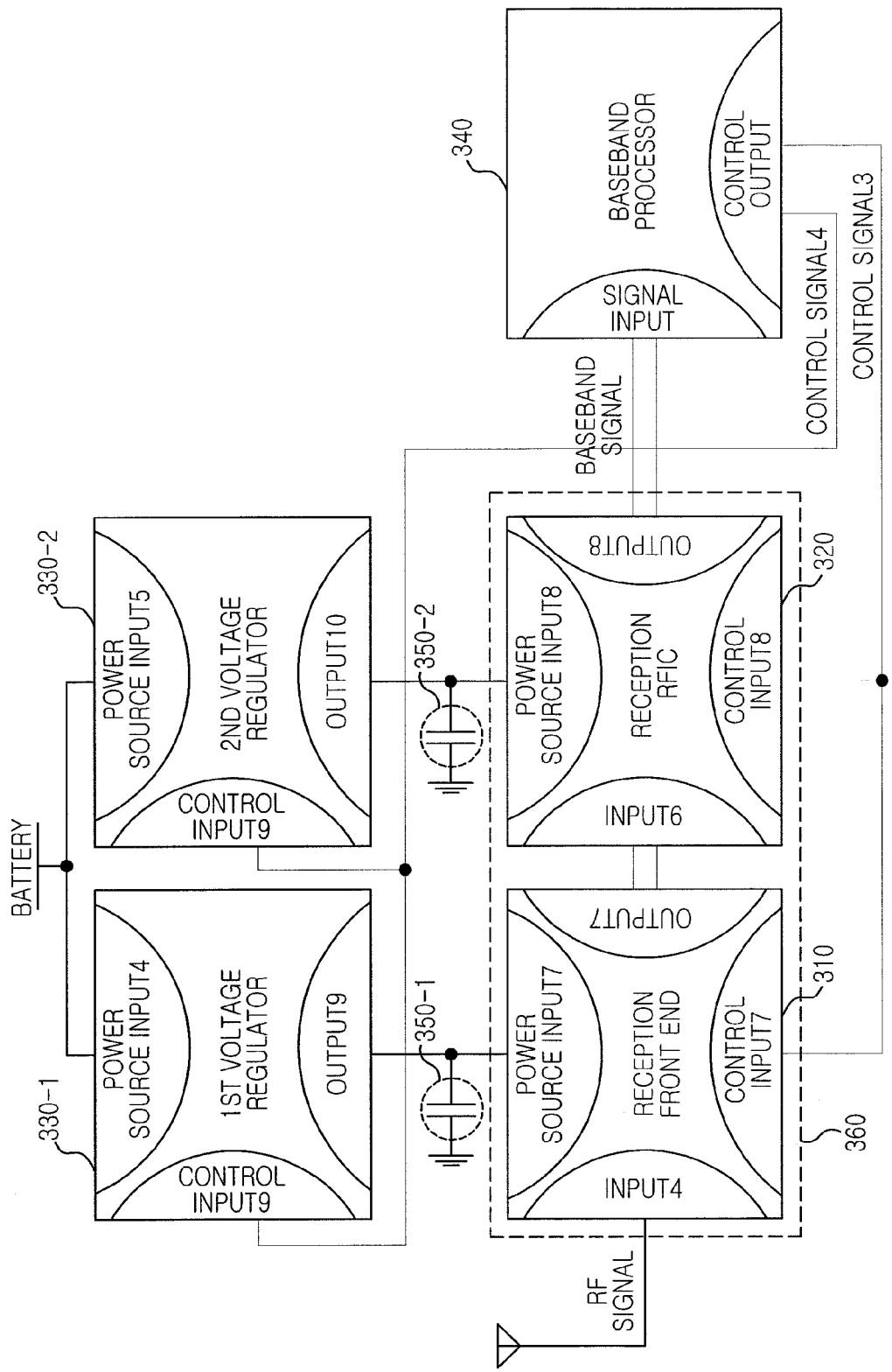
FIG. 3 illustrates a receiver in a wireless communication system according to an exemplary embodiment of the present invention.

FIG. 3 illustrates a receiver in a wireless communication system according to an exemplary embodiment of the present invention.

Referring to FIG. 3, the aforementioned timing rules may be applied to a receiver performing a DRX operation according to an exemplary embodiment of the present invention, and the receiver includes a reception front end 310 and a reception RFIC 320 that are receiver core devices. The receiver further includes a plurality of voltage regulators 330-1 and 330-2 for supplying power sources of regulated voltages to the core devices, and includes a baseband processor 340 for controlling other blocks. In controlling the other blocks, the baseband processor 340 may also be referred to as a 'controller'. A control signal output from a control output port of the baseband processor 340 includes a control signal 3 and a control signal 4. According to an exemplary embodiment of the present invention, the control signal 3 and the control signal 4 may be one control signal. Also, the control signals output from the baseband processor 340 may further include other control signals supplied to other core devices. The reception front end 310 and the reception RFIC 320, which may also be referred to as core devices 310 and 320, are provided with the power sources from the voltage regulators 330-1 and 330-2 and therefore, may be commonly called a power source consumer 360.

The reception front end 310 performs de-multiplexing of a received signal, duplexing, filtering, antenna switching, and other similar operations and functions. That is, although not shown, the reception front end 310 may include a De-Multiplexer (DEMUX), a duplexer, a filter, a switch and other similar features and elements. The reception RFIC 320 converts an RF band signal provided from the reception front end 310 into a baseband signal. That is, although not shown, the reception RFIC 320 may include an oscillator, a mixer and other similar features and elements.

Although not shown in FIG. 3, according to another exemplary embodiment of the present invention, for a case where a corresponding core device does not need a regulated voltage according to the characteristic of the core device or the requirement thereof, the voltage regulators 330-1 and 330-2 may support an operation of bypassing, such that a basic power source is directly supplied without voltage regulation. For example, the basic power source may be a battery power. Also, for the sake of regulation of an output voltage of each of the first voltage regulator 330-1 and the second voltage regulator 330-2, capacitors 350-1 and 350-2 are respectively disposed at output ports of the first voltage regulator 330-1 and the second voltage regulator 330-2. The capacitors 350-1 and 350-2 are respectively connected at one end to the output ports of the voltage regulators 330-1 and 330-2 and are respectively connected at the other end to the ground.

As illustrated in FIG. 3, a scheme of supplying power sources apart from each core device, using the plurality of voltage regulators 330-1 and 330-2, is suitable when source voltages of the receiver core devices are different from each other. If two or more core devices need the same source voltage, at least one of the plurality of voltage regulators 330-1 and 330-2 may be excluded, and the two or more core devices may share one power source. In such a case, the capacitors 350-1 and 350-2 may be omitted at a quantity corresponding to the number of the excluded voltage regulators.

In accordance with the aforementioned timing rules, at initial power-up of a communication device, the baseband processor 340 turns off the voltage regulators 330-1 and 330-2 after output voltages of the voltage regulators 330-1 and 330-2 reach required voltages of the core devices 310 and 320 by charging the capacitors 350-1 and 350-2. In detail, the condition of turning off the voltage regulators 330-1 and 330-2 may be one of whether the output voltages of the voltage regulators 330-1 and 330-2 are greater than a predefined first threshold, and whether a predefined first duration time after the turn-on of the voltage regulators 330-1 and 330-2 has lapsed. Here, the first duration time may be decided based on an average charging time of the capacitors 350-1 and 350-2. For example, the turn-off operations of the voltage regulators 330-1 and 330-2 may be realized through an analog feedback loop circuit, or may be programmed using a means such as a CPU, a DSP, and other similar and/or suitable devices.

In accordance with the aforementioned timing rules, while a DRX mode is performed, the baseband processor 340 turns off the voltage regulators 330-1 and 330-2, the reception front end 310, and the reception RFIC 320 within a DRX non-reception interval. According to this, the capacitors 350-1 and 350-2 repeat charging and discharging at short time intervals during the DRX mode and, due to this, the output voltages of the voltage regulators 330-1 and 330-2 may be maintained at or greater than a constant value.

In accordance with the aforementioned timing rules, when the voltage regulators 330-1 and 330-2 maintain the off state for a long time period, due to an idle state or a deep sleep state, then the baseband processor 340 turns on the voltage regulators 330-1 and 330-2 such that the capacitors 350-1 and 350-2 are charged. The condition of turning on the voltage regulators 330-1 and 330-2 may be one of whether the output voltages of the voltage regulators 330-1 and 330-2 are less than a predefined second threshold, and whether a predefined second duration time after the turn-off of the voltage regulators 330-1 and 330-2 has lapsed. For example, the turn-on operations of the voltage regulators 330-1 and 330-2 may be realized through an analog feedback loop circuit, or may be programmed using a means such as a CPU and a DSP.

Figure 4:
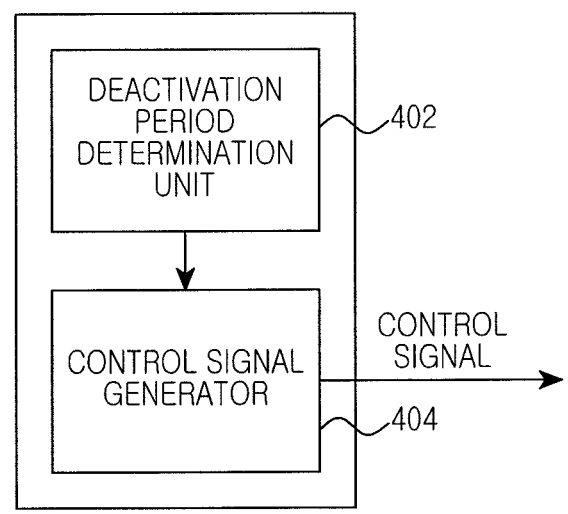
FIG. 4 illustrates a baseband processor in a wireless communication system according to an exemplary embodiment of the present invention.

FIG. 4 illustrates a baseband processor in a wireless communication system according to an exemplary embodiment of the present invention.

The construction of the baseband processor illustrated in FIG. 4 may be applied to the baseband processor 250 of FIG. 2 and the baseband processor 340 of FIG. 3.

Referring to FIG. 4, the baseband processor includes a deactivation period determination unit 402 and a control signal generator 404. The deactivation period determination unit 402 determines a deactivation period according to a DTX mode and a DRX mode. Here, the deactivation period represents an interval in which core devices of a transmitter do not operate according to the DTX mode, and an interval in which core devices of a receiver do not operate according to the DRX mode. The deactivation period determination unit 402 controls the control signal generator 404 to generate a control signal for turning off a power source consumer within the transmitter or receiver, and at least one voltage regulator therein, during the deactivation period. The control signal generator 404 outputs the control signal for turning off the power source consumer within the transmitter or receiver, and the at least one voltage regulator therein, during the deactivation period.

According to another exemplary embodiment of the present invention, when applying a power source of a communication device, the control signal generator 404 outputs a control signal for maintaining the power source consumer in an off state and a control signal for turning on the at least one voltage regulator. Next, after the control signal generator 404 turns on the at least one voltage regulator, the control signal generator 404 outputs a control signal for turning off the at least one voltage regulator, if an output voltage of the at least one voltage regulator is greater than a first threshold.

According to yet another exemplary embodiment of the present invention, when the at least one voltage regulator is in an off state, the control signal generator 404 outputs a control signal for turning on the at least one voltage regulator, if the output voltage of the at least one voltage regulator is less than a second threshold. Otherwise, the control signal generator 404 outputs the control signal for turning on the at least one voltage regulator if a predefined second duration time has lapsed after the turn-off of the at least one voltage regulator FIG. 5 is a flowchart illustrating a DTX/DRX mode execution in a wireless communication system according to an exemplary embodiment of the present invention.

Figure 5:
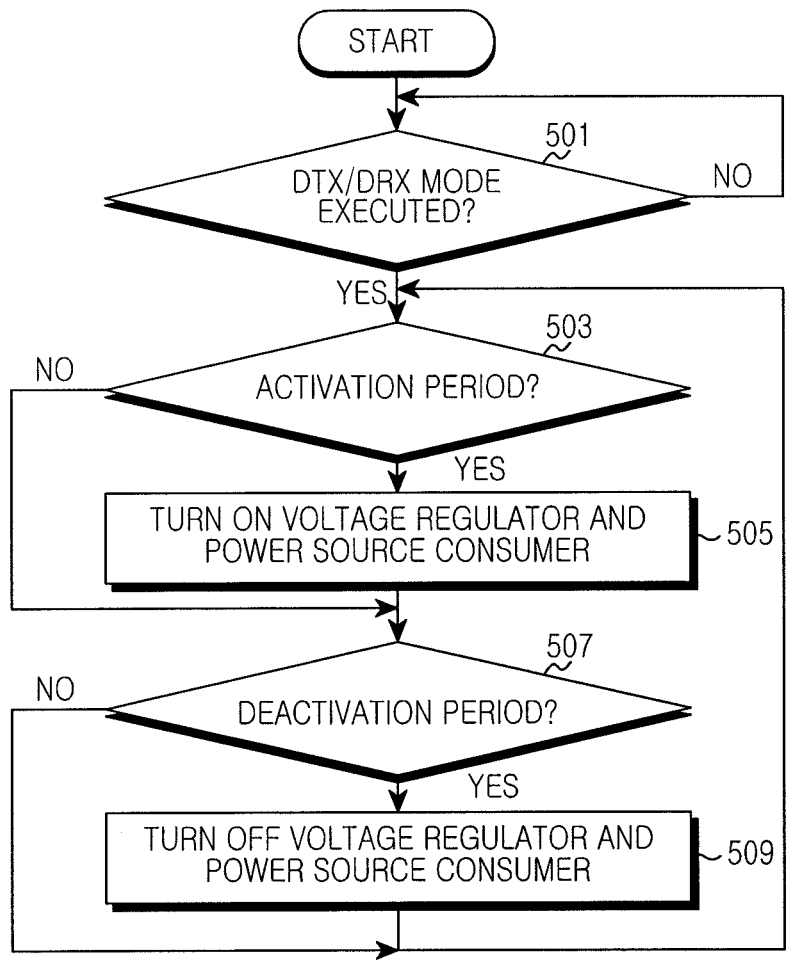
FIG. 5 is a flowchart illustrating a DTX/Discontinuous Reception (DRX) mode execution in a wireless communication system according to an exemplary embodiment of the present invention.

The exemplary embodiment of FIG. 5 is a transmission/reception operation control procedure without respect to a transmitter and a receiver. However, according to an exemplary embodiment of the present invention, the procedure of FIG. 5 may be implemented only to the transmitter, or may be applied only to the receiver, or may be applied to both the transmitter and the receiver.

Referring to FIG. 5, in step 501, the communication device determines whether a DTX/DRX mode is executed. If the DTX/DRX mode is executed, then, in step 503, the communication device determines whether it is an activation period. If it is the activation period, then, in step 505, the communication device turns on at least one voltage regulator and a power source consumer. Here, the power source consumer may be a block within the transmitter that is performing an operation for transmitting a signal and a block in the receiver that is performing an operation for receiving a signal, using a power source supplied from the at least one voltage regulator. In other words, the power source consumer processes an RF signal using the power source supplied from the at least one voltage regulator. For example, the power source consumer includes at least one of a transmission RFIC, a PA, a transmission front end, a reception front end, and a reception RFIC. The transmission RFIC and the reception RFIC may each include an oscillator, a mixer, and other similar elements and/or devices. The transmission front end may include a multiplexer (MUX), a duplexer, a filter, a switch, and other similar elements and/or devices. The reception front end may include a de-multiplexer (DEMUX), a duplexer, a filter, a switch, and other similar elements and/or devices.

Next, in step 507, the communication device determines whether a deactivation period is occurring. If it is the deactivation period, then, in step 509, the communication device turns off the at least one voltage regulator and the power source consumer. That is, while the communication device operates in the DTX/DRX mode, the communication device turns on/off the at least one voltage regulator together with the power source consumer. At this time, in order for a state transition to occur within a length of one CP, the at least one voltage regulator supports the performance of activation/deactivation within a time shorter than the length of one CP.

Figure 6:
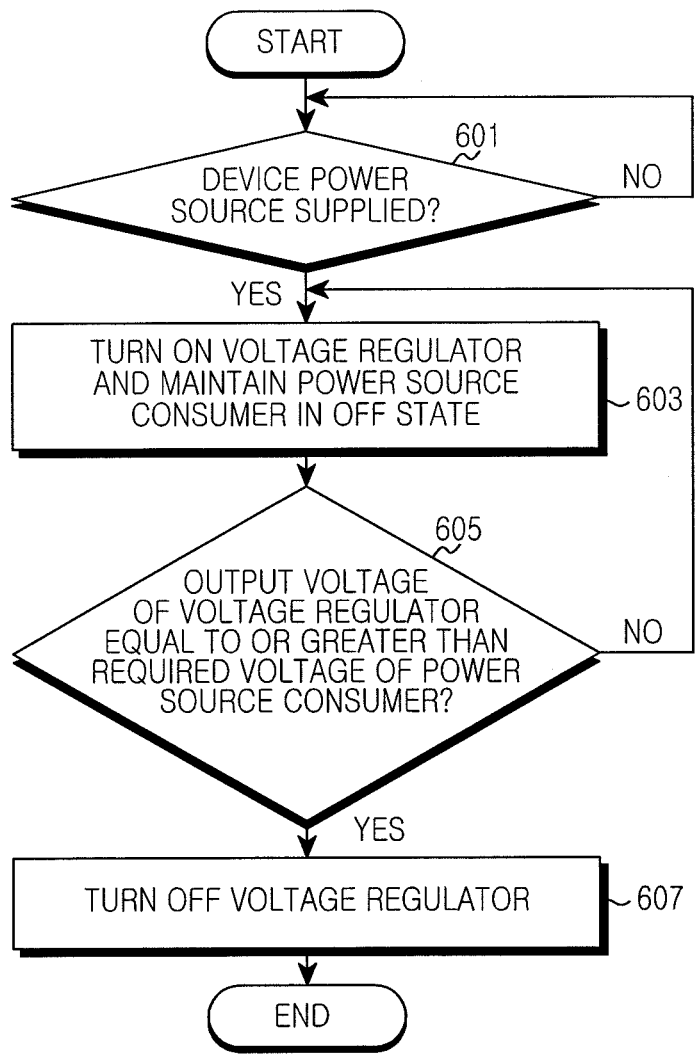
FIG. 6 is a flowchart illustrating power application of a device in a wireless communication system according to an exemplary embodiment of the present invention.

FIG. 6 is a flowchart illustrating power source application of a device in a wireless communication system according to an exemplary embodiment of the present invention.

The exemplary embodiment of FIG. 6 is a transmission and reception operation control procedure without respect to a transmitter and a receiver. However, according to an exemplary embodiment of the present invention, the procedure of FIG. 6 may be applied to only the transmitter, or may be applied to only the receiver, or may be applied to both the transmitter and the receiver.

Referring to FIG. 6, in step 601, the communication device determines whether a power source is supplied. In other words, the communication device determines whether it is powered up.

After the power source is applied, then, in step 603, the communication device turns on at least one voltage regulator for supplying a power source to a power source consumer, and maintains the transceiver power source consumer in an off state. Here, the power source consumer may be a block within the transmitter for performing an operation for transmitting a signal using the power source supplied from the at least one voltage regulator and may be a block within the receiver for performing an operation for receiving a signal. In other words, the communication device activates the at least one voltage regulator for supplying a regulated DC power source to the power source consumer, and maintains the power source consumer in the off state. Accordingly, at least one load capacitor connected to an output port of the at least one voltage regulator is charged by virtue of an operation of the at least one voltage regulator.

Next, in step 605, the communication device determines whether an output voltage of the at least one voltage regulator is greater than or equal to a voltage used by the power source consumer. For instance, the communication device determines whether the output voltage of the at least one voltage regulator is greater than a predefined first threshold, or if a predefined first duration time after the turn-on of the at least one voltage regulator has lapsed.

If the output voltage of the at least one voltage regulator is greater than or equal to the voltage required as the power of the power source consumer as determined in step 605, then, in step 607, the communication device turns off the at least one voltage regulator. As the at least one voltage regulator is turned on, in step 603, then the at least one load capacitor is charged and the output voltage of the at least one voltage regulator increases. Accordingly, the communication device maintains the at least one voltage regulator in an on state until before the voltage of the at least one voltage regulator reaches the required voltage value of the power source consumer. Here, the turn-off operation of the at least one voltage regulator may be realized through an analog feedback loop circuit, or be programmed using a CPU, a DSP, and other similar processing and computing elements or devices.

Figure 7:
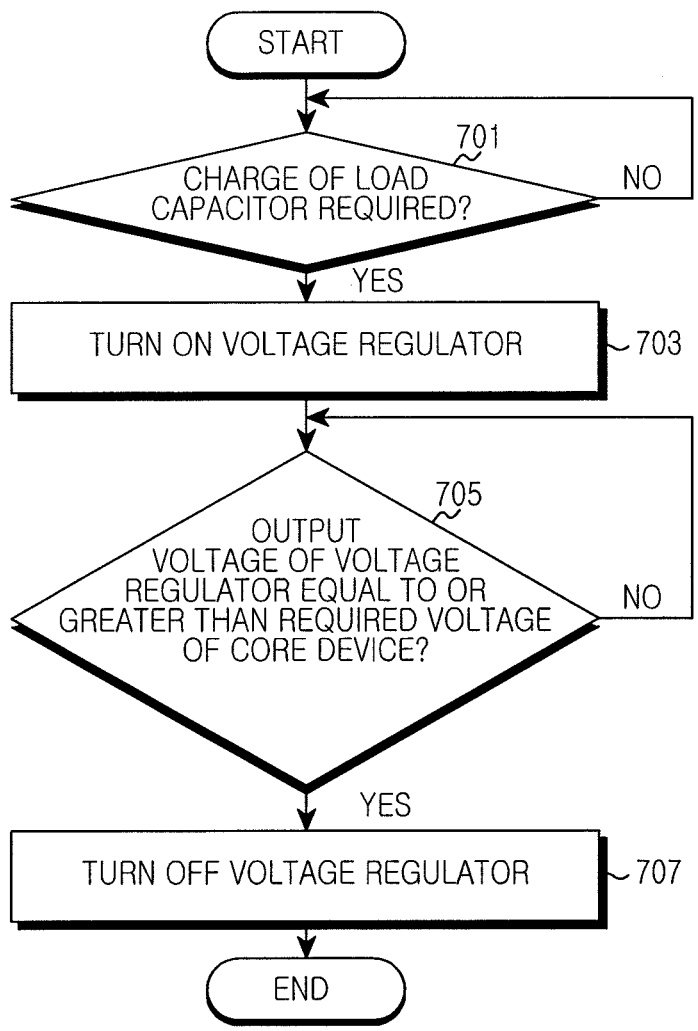
FIG. 7 is a flowchart illustrating discharge of a load capacitor in a wireless communication system according to an exemplary embodiment of the present invention.

FIG. 7 is a flowchart illustrating discharge of a load capacitor in a wireless communication system according to an exemplary embodiment of the present invention.

The exemplary embodiment of FIG. 7 may be applied to only to the transmitter, or may be applied only to the receiver, or may be applied to both the transmitter and the receiver.

Referring to FIG. 7, in step 701, the communication device determines whether charging of at least one load capacitor is required. The load capacitor, which is a capacitor connected to an output port of at least one voltage regulator supplying a power source to a power source consumer, is charged while the at least one voltage regulator operates. Here, the power source consumer is a block of the transmitter for transmitting a signal using a power source supplied from the at least one voltage regulator and a block of the receiver for receiving a signal within the receiver. For example, the charging of the at least one load capacitor is required includes a case when an output voltage of the at least one voltage regulator is lowered below a constant level due to long discharging time of the at least one load capacitor. For example, when the at least one voltage regulator maintains an off state for a long time, such as an idle state or deep sleep state, then the at least one load capacitor may be discharged for a long time. In other words, the communication device determines whether the output voltage of the at least one voltage regulator is less than a predefined second threshold, or if a predefined second duration time after the turn-off of the at least one voltage regulator has lapsed.

If the charge of the at least one load capacitor is required, then, in step 703, the communication device turns on the at least one voltage regulator. That is, in order to recover the output voltage of the at least one voltage regulator that is dropped due to the discharge of the at least one load capacitor, the communication device turns on the at least one voltage regulator, irrespective of the activation or deactivation of the power source consumer. Accordingly, the at least one load capacitor is again charged. Here, the turn-on operation of the at least one voltage regulator may be realized through an analog feedback loop circuit, or may be programmed using a CPU, a DSP and other similar devices.

Next, in step 705, the communication device determines whether the output voltage of the at least one voltage regulator is greater than or equal to a required voltage of the power source consumer, which is also referred to as a core device.

For instance, the communication device determines whether the output voltage of the at least one voltage regulator is greater than a predefined first threshold, or if a predefined first duration time after the turn-on of the at least one voltage regulator has lapsed.

If the output voltage of the at least one voltage regulator is greater than or equal to the required voltage of the power source consumer, then, in step 707, the communication device turns off the at least one voltage regulator. As the at least one voltage regulator is turned on, in step 703, the at least one load capacitor is charged and the output voltage of the at least one voltage regulator increases. Accordingly, the communication device maintains the at least one voltage regulator in an on state until before the voltage of the at least one voltage regulator reaches the required voltage value of the power source consumer. Here, the turn-off operation of the at least one voltage regulator may be realized through an analog feedback loop circuit, or be programmed using a CPU, a DSP, and any other similar or suitable device or item.

Although not illustrated in FIG. 7, the communication device may monitor a battery voltage. If the battery voltage is below a reference voltage, or if a shut-down command by a user is generated, then the communication device is shut down. Due to this, the at least one voltage regulator and the core devices of the transceiver are all turned off as well.

Figure 8:
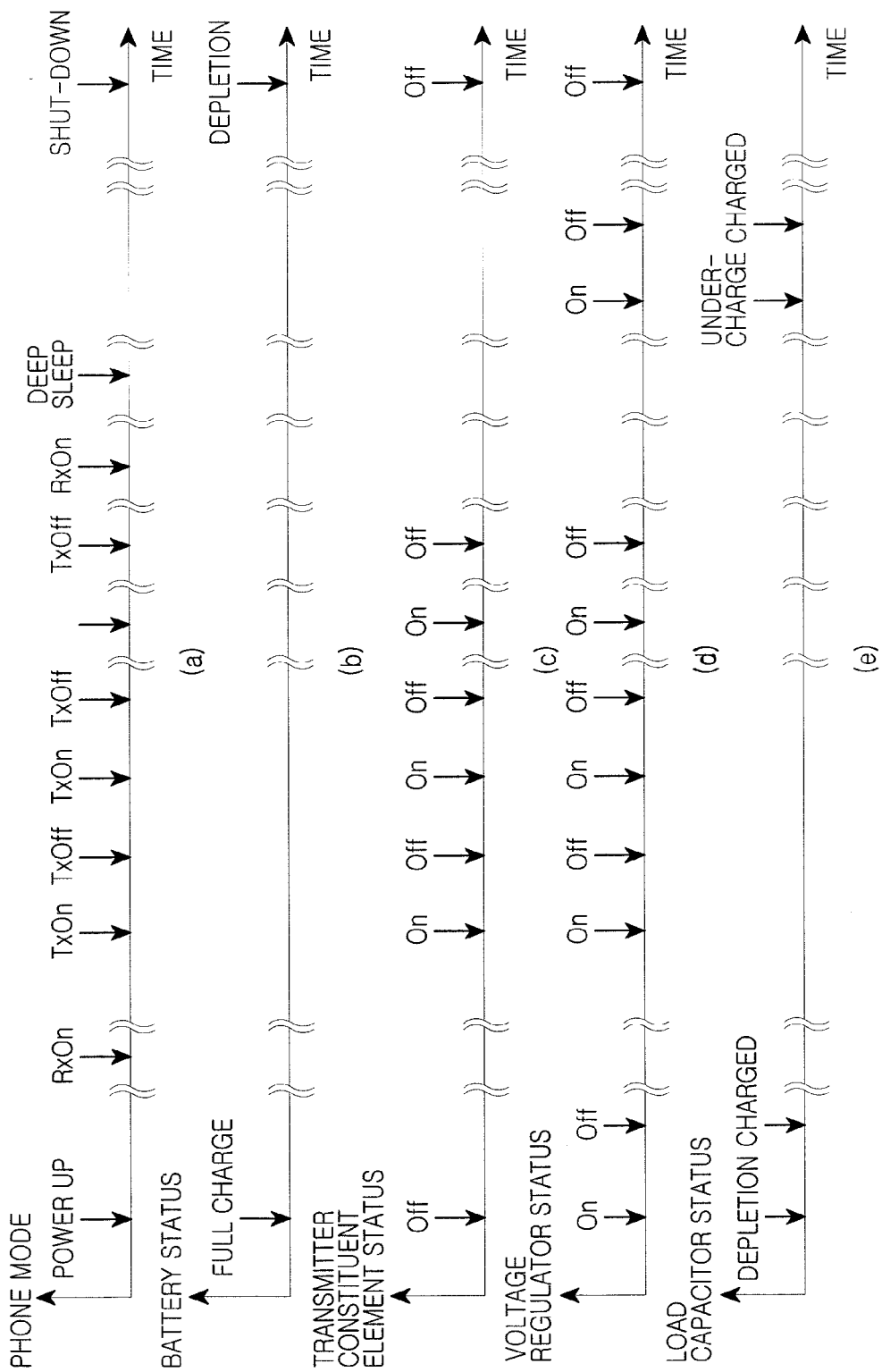
FIG. 8 is a graph illustrating a state variation by constituent elements of a communication device in a wireless communication system according to an exemplary embodiment of the present invention.

FIG. 8 illustrates a state variation by constituent element of a communication device in a wireless communication system according to an exemplary embodiment of the present invention.

Referring to FIG. 8, part (a) illustrates an activation state of the communication device that operates in a phone mode, part (b) illustrates a status of a battery, part (c) illustrates a status of transmitter core devices, part (d) illustrates a status of a voltage regulator, and part (e) illustrates a status of a load capacitor. As illustrated in part (a), the communication device equipped with a fully charged battery is powered up, and a battery charge amount decreases with the use of the communication device. According to this, as shown in parts (c) and (d), the transmitter core devices and the voltage regulators repeat turning on/off during one cycle until the communication device is shut down. As shown in part (e), the load capacitor repeats charging and discharging according to the on/off of the voltage regulator.

Figure 9:
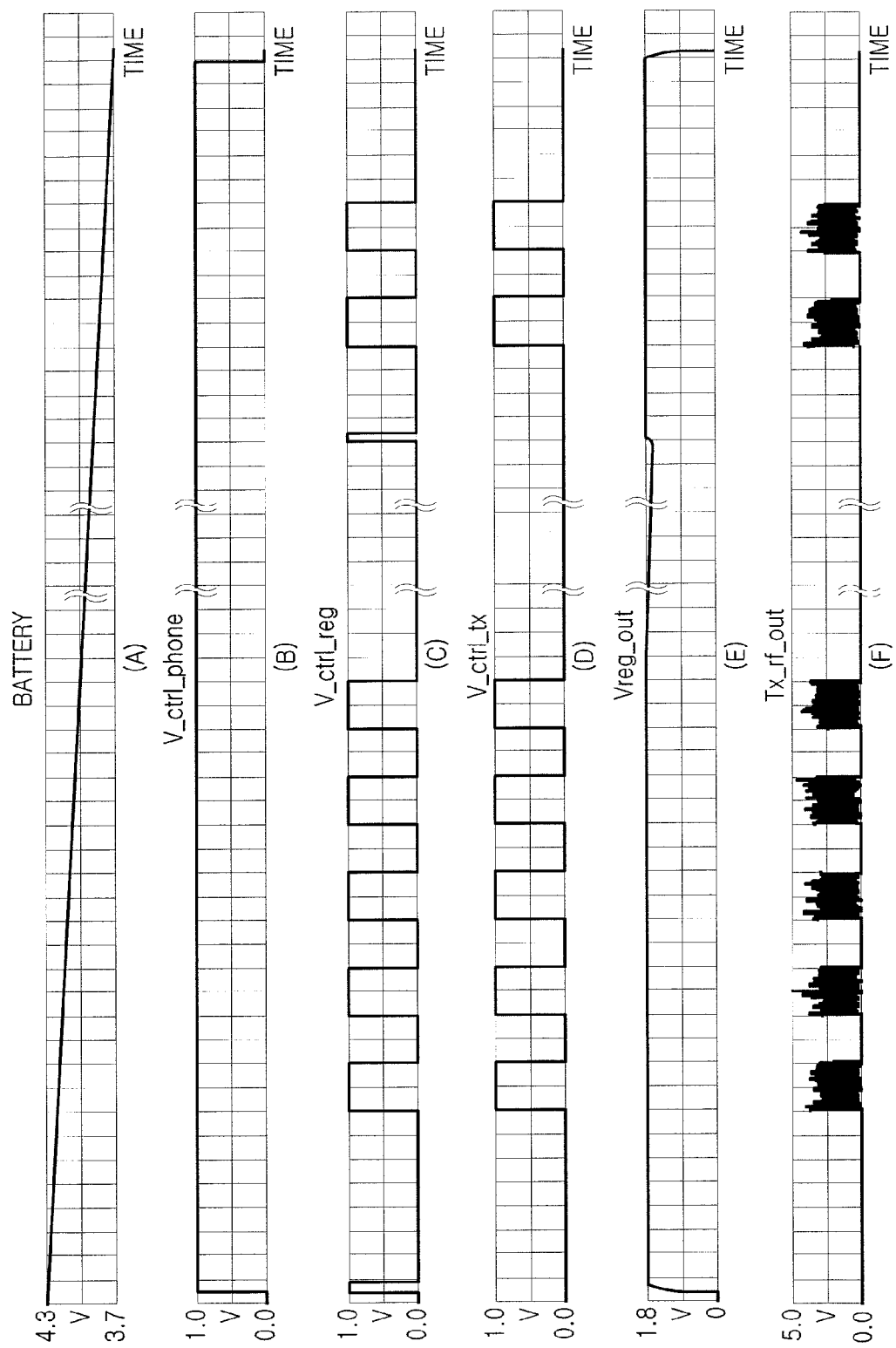
FIG. 9 is a graph illustrating control signals of core devices of a transmitter in a wireless communication system according to an exemplary embodiment of the present invention.

FIG. 9 illustrates control signals of core devices of a transmitter in a wireless communication system according to an exemplary embodiment of the present invention.

Referring to FIG. 9, as shown in part (a), a battery charge decreases with respect to time. Also, as shown in parts (c) and (d), control signals V_ctrl_reg, for controlling a voltage regulator, and V_ctrl_tx, for controlling transmission, vary according to a DTX mode. Accordingly, although the voltage regulator repeats turning on/off, as shown in part (e), an output voltage Vreg_out of the voltage regulator is maintained to be at or greater than a predetermined magnitude by a load capacitor. As shown in part (f), a transmission RF output Tx_rf_out varies according to the control signal V_ctrl_tx. Additionally, as shown in part (b), a control signal V_ctrl_phone is maintained at a predetermined magnitude.

As described above, the present invention may minimize an amount of current consumed by voltage regulators by using control rules for minimizing current consumed during a DTX/DRX mode of a wireless communication system. Furthermore, according to a transmission and/or reception control technique of the present exemplary embodiments, at execution of the DTX/DRX mode, a state transition operation is achieved within a very short time and, thus, a signal loss is minimized, whereby throughput improvement may be achieved.

While the invention has been shown and described with reference to certain preferred exemplary embodiments thereof, it will be understood by those skilled in the art that various changes in form and details may be made therein without departing from the spirit and scope of the invention as defined by the appended claims and their equivalents.

What is claimed is:

1. A communication apparatus in a wireless communication system, the apparatus comprising:
   at least one voltage regulator configured to provide a power source;
   at least one unit configured to process a Radio Frequency (RF) signal using the power source;
   a controller configured to selectively enable the at least one voltage regulator during an active mode of the communication apparatus; and
   at least one capacitor configured to maintain an output voltage of the at least one voltage regulator to be greater than a predefined value while the at least one voltage regulator is disable,
   wherein the controller is configured to:
   disable the at least one voltage regulator, and
   enable the at least one voltage regulator to charge the at least one capacitor if the output voltage of the at least one voltage regulator is lowered below a threshold.

2. The apparatus of claim 1, wherein the at least one unit comprises at least one of a Power Amplifier (PA), an oscillator, a mixer, a multiplexer (MUX), a de-multiplexer (DE-MUX), a duplexer, a filter, and a switch.

3. The apparatus of claim 1,
   wherein the controller is configured to:
   disable the at least one voltage regulator during a first period of the active mode, and
   enable the at least one voltage regulator during a second period of the active mode, and
   wherein the first period and the second period are determined by one of a Discontinuous Transmission (DTX) mode and a Discontinuous Reception (DRX) mode.

4. The apparatus of claim 1, wherein the controller is configured to enable the at least one voltage regulator while maintaining the at least one unit in an off state, when the communication apparatus is initially turned on.

5. The apparatus of claim 4, wherein the controller, after the communication apparatus is initially turned on, is configured to disable the at least one voltage regulator if the output voltage of the at least one voltage regulator is greater than another threshold.

6. The apparatus of claim 4, wherein the controller, after the communication apparatus is initially turned on, is configured to disable the at least one voltage regulator if a first time period lapses.

7. The apparatus of claim 1, wherein the controller, after disabling the at least one voltage regulator, is configured to enable the at least one voltage regulator if a predefined second time period has lapsed.

8. The apparatus of claim 1, wherein the controller is configured to provide a common control signal for enabling or disabling the at least one voltage regulator.

9. The apparatus of claim 1, wherein the controller is configured to provide a common control signal of turning on or off the at least one unit.

10. A method for operating a communication device in a wireless communication system, the method comprising:

enabling at least one voltage regulator to charge at least one capacitor;

disabling the at least one voltage regulator; and enabling the at least one voltage regulator to charge the at least one capacitor if the output voltage of the at least one voltage regulator is lowered below a threshold, wherein the at least one capacitor maintains an output voltage of the at least one voltage regulator to be greater than a predefined value while the at least one voltage regulator is disabled.

11. The method of claim 10, wherein the at least one voltage regulator is disabled during a first period of the active mode, wherein the at least one voltage regulator is enabled during a second period of the active mode, and wherein the first period and the second period are determined by one of a Discontinuous Transmission (DTX) mode and a Discontinuous Reception (DRX) mode.

12. The method of claim 10, further comprising:

after enabling the at least one voltage regulator, disabling the at least one voltage regulator if an output voltage of the at least one voltage regulator is greater than another threshold.

13. The method of claim 10, wherein the enabling of the at least one voltage regulator comprises enabling the at least one voltage regulator if a predefined second time period lapses after disabling the at least one voltage regulator.

14. A baseband processing apparatus of a communication device in a wireless communication system, the apparatus comprising:

a generator configured to selectively generate a first control signal for disabling at least one voltage regulator and a second control signal for enabling the at least one voltage regulator during an active mode of the communication apparatus, wherein the generator is configured to:

generate the second signal to charge at least one capacitor, generate the first signal, and generate the second signal to charge the at least one capacitor if the output voltage of the at least one voltage regulator is lowered below a threshold, and wherein the at least one capacitor maintains an output voltage of the at least one voltage regulator to be greater than a predefined value while the at least one voltage regulator is disabled.

15. The method of claim 10, further comprising:

enabling the at least one voltage regulator while maintaining the at least one unit in an off state, when the communication apparatus is initially turned on.

16. The method of claim 15, further comprising:

after the communication apparatus is initially turned on, disables the at least one voltage regulator if the output voltage of the at least one voltage regulator is greater than another threshold.

17. The method of claim 15, further comprising:

after the communication apparatus is initially turned on, disabling the at least one voltage regulator if a first time period lapses.

18. The method of claim 10, wherein the enabling the at least one voltage regulator comprises, enabling the at least one voltage regulator if a predefined second time period has lapsed after disabling the at least one voltage regulator.

* * * * *